(12) United States Patent
Finley et al.

(10) Patent No.: US 9,518,191 B2
(45) Date of Patent: Dec. 13, 2016

(54) DISPERSIONS OF CROSS-LINKED LATEX POLYMER PARTICLES AND A CURABLE AMINO RESIN

(75) Inventors: Maureen Joanne Finley, Churchville, PA (US); Michael DeWayne Kelly, North Wales, PA (US)

(73) Assignee: Rohm and Haas Company, Philadelphia, PA (US)

( * ) Notice: Subject to any disclaimer, the term of this patent is extended or adjusted under 35 U.S.C. 154(b) by 1592 days.

(21) Appl. No.: 12/316,404

(22) Filed: Dec. 12, 2008

(65) Prior Publication Data

US 2009/0155474 A1 Jun. 18, 2009

Related U.S. Application Data

(60) Provisional application No. 61/008,036, filed on Dec. 18, 2007.

(51) Int. Cl.
| | |
|---|---|
| C08L 61/24 | (2006.01) |
| C08L 61/26 | (2006.01) |
| C08L 61/28 | (2006.01) |
| C09D 133/04 | (2006.01) |
| C08K 5/16 | (2006.01) |
| C08L 33/04 | (2006.01) |

(52) U.S. Cl.
CPC ............... C09D 133/04 (2013.01); C08K 5/16 (2013.01); C08L 33/04 (2013.01); C08L 61/24 (2013.01); C08L 61/26 (2013.01); C08L 61/28 (2013.01)

(58) Field of Classification Search
USPC ........................................................ 525/518
See application file for complete search history.

(56) References Cited

U.S. PATENT DOCUMENTS

| | | | |
|---|---|---|---|
| 4,258,098 A * | 3/1981 | Bondoc et al. | 162/156 |
| 4,329,266 A | 5/1982 | Suzuki et al. | |
| 4,384,056 A | 5/1983 | Schmidt et al. | |
| 4,473,678 A * | 9/1984 | Fink et al. | 524/211 |
| 4,539,361 A | 9/1985 | Siol et al. | |
| 4,560,612 A | 12/1985 | Yau | |
| 4,731,290 A * | 3/1988 | Chang | 428/335 |
| 4,859,508 A * | 8/1989 | Pangrazi et al. | 427/389.9 |
| 4,917,764 A | 4/1990 | Lalwani et al. | |
| 5,334,648 A | 8/1994 | Drews et al. | |
| 5,521,266 A | 5/1996 | Lau | |
| 5,804,254 A | 9/1998 | Nedwick et al. | |
| 5,914,365 A | 6/1999 | Chang et al. | |
| 6,642,299 B2 | 11/2003 | Wertz et al. | |
| 6,770,169 B1 | 8/2004 | Wallace | |
| 2001/0024693 A1* | 9/2001 | Morimoto et al. | 427/404 |
| 2001/0031826 A1 | 10/2001 | Laubender et al. | |
| 2003/0149119 A1 | 8/2003 | Schultz | |
| 2004/0134791 A1* | 7/2004 | Toi et al. | 205/196 |
| 2005/0048212 A1 | 3/2005 | Clamen et al. | |
| 2009/0124151 A1* | 5/2009 | Shoemake | 442/180 |

FOREIGN PATENT DOCUMENTS

| | | |
|---|---|---|
| AU | 715580 B * | 2/2000 |
| EP | 0 239 849 A | 10/1987 |
| EP | 0 239 850 A | 10/1987 |
| EP | 0 279 441 A | 8/1988 |
| EP | 0 555 774 A | 9/1993 |
| GB | 1462499 A * | 1/1977 |
| JP | 55067586 A * | 5/1980 |
| JP | 01261480 A * | 10/1989 |
| JP | 1989261480 A | 10/1989 |
| JP | 3281679 | 12/1991 |
| JP | 9170151 | 6/1997 |
| WO | WO 9734952 A1 * | 9/1997 |

OTHER PUBLICATIONS

CAPlus ABstract of JP 01261480 A (AN: 1990:160047, 2 pages, Entered Apr. 28, 1990).*
Derwent Abstract of JP 55-067586 (AN 1980-47273C, May 1980).*

\* cited by examiner

Primary Examiner — Brieann R Fink
(74) Attorney, Agent, or Firm — Andrew Merriam

(57) ABSTRACT

A water-dispersed coating composition comprising an amino resin, and a dispersion of latex polymer particles comprising from 0.1 to 2 weight percent of a multi-ethylenically unsaturated monomer and from 0.1 to 2 weight percent of (meth)acrylamide.

8 Claims, No Drawings

DISPERSIONS OF CROSS-LINKED LATEX POLYMER PARTICLES AND A CURABLE AMINO RESIN

This application claims the benefit of priority under 35 U.S.C. §119(e) of U.S. Provisional Patent Application No. 61/008,036 filed on Dec. 18, 2007.

This invention relates to a water-dispersed coating composition for flexibilizing cured amino resin-bound glass fiber nonwovens. More particularly, this invention relates to a water-dispersed coating composition comprising, in admixture, (a) a dispersion of latex polymer particles comprising from 96 to 99.8 weight percent of at least one monoethylenically unsaturated monomer; from 0.1 to 2 weight percent of a multi-ethylenically unsaturated monomer; from 0.1 to 2 weight percent of (meth)acrylamide; and optionally from 0 to 2 weight percent of an acid functional monomer; and (b) at least one amino resin.

When used as a coating for glass fiber non-wovens, or glass fiber mats ("mats") the present invention serves to provide a glass fiber non-woven with improved wet and dry tensile strength and tear strength relative to a glass fiber non-woven in which either the amino resin is used as the sole binder for the mat or wherein the amino resin is admixed with latex polymer particles that do not comprise both the multi-ethylenically unsaturated monomer and the (meth)acrylamide.

U.S. Pat. No. 4,473,678 discloses aqueous dispersions of a self-crosslinking synthetic resin which comprises, among other things, resin particles formed of a vinyl polymer comprising 0.1 to 10 weight % of N-methylol-acrylamide or -methacrylamide. The dispersions disclosed therein are specific to self-crosslinking resins with N-methylol groups. However, the balance of properties is compromised in these, and other, self-crosslinking systems. Specifically, they suffer from low tear strength.

Glass fiber non-wovens made with a binder consisting essentially of an amino resin, most commonly a urea formaldehyde resin, often are brittle. Additionally, the strength properties of the mats may deteriorate appreciably subsequent to their preparation, especially when the mats are subjected to wet conditions. For this reason, amino resin binders have commonly been modified by formulating the amino resin with cross-linkers and various catalyst systems or by fortifying the amino resin with a large amount of latex (emulsion) polymer, typically one containing methylolacrylamide to provide self-crosslinking. The latter term actually refers to the fact that functionality on the latex directly crosslinks with the amino resin without the additional need for the cross-linkers and various catalyst systems previously used. These self-crosslinking latexes can provide some level of increased wet tensile strength, but the need for greater mechanical strength has grown as production line speeds increase to satisfy greater product demand. The increase in line speeds puts an additional stress on the coated web material, which results in the web breaking in the wrap. The latter is a serious issue for the manufacturers. Additionally, the faster line speed reduces the residence time in the oven making it difficult to achieve full curing of the binder.

The problem faced by the inventors is the provision of an amino resin based binder composition, which delivers greater mechanical strength, as demonstrated by a balance of tensile strength and tear strength, while retaining a high wet tensile strength.

The inventors have surprisingly found that a certain internally cross-linked latex emulsion polymer added to an amino resin composition provides significant improvement in tensile strength, both dry and wet, and tear strength, compared to current high performance commercial products comprising acrylic modified amino resin compositions which employ self-crosslinking monomers such as methylolacrylamide. The internally cross-linked latex emulsion polymer modifier comprises a multi-ethylenically unsaturated monomer to crosslink the latex polymer, which additionally comprises (meth)acrylamide. This is surprising in view of the lore of the art, which assumes that the mechanical properties are optimized by crosslinking any added polymer directly to the amino resin.

The present invention provides water-dispersed coating compositions comprising a) at least one aqueous dispersion of particles made from a copolymer, based on the weight of the copolymer, comprising: (i) from 96 to 99.8 weight percent of at least one monoethylenically unsaturated nonionic monomer not including the (meth)acrylamide of component (iii); (ii) from 0.1 to 2 weight percent of a multi-ethylenically unsaturated monomer; (iii) from 0.1 to 2 weight percent of (meth)acrylamide; wherein the said copolymer comprises no more than 1 weight percent, based on the weight of the copolymer, of a self-crosslinking monomer; and b) at least one amino resin selected from the group consisting of melamine/formaldehyde resin, urea/formaldehyde resin, guanamine/formaldehyde resin, benzoguanamine/formaldehyde resin and acetoguanamine/formaldehyde resin or combinations thereof; wherein the ratio of components a:b is from 1:99 to 20:80 based on the solids of both components.

In one embodiment, the multi-ethylenically unsaturated monomer of the copolymer is selected from the group consisting of allyl(meth)acrylate, divinylbenzene, diallyl phthalate, 1,4-butylene glycol di(meth)acrylate, and 1,6-hexanediol di(meth)acrylate or combinations thereof. Specifically, in one embodiment, the multi-ethylenically unsaturated monomer comprises allyl(meth)acrylate.

In one embodiment, the copolymer of the composition further comprises from 0.1 to 2 weight percent of one or more acid functional monomer. Preferably, the acid functional monomer comprises acrylic acid or methacrylic acid. In an embodiment, the composition further comprises N,N-dimethylaminoethyl(meth)acrylate, N,N-dimethylaminopropyl(meth)acrylamide, N-vinyl pyrrolidinone, or hydroxyethyl(meth)acrylate, or combinations thereof.

In one embodiment, the copolymer of the composition comprises no more than 1 weight percent, based on the weight of the copolymer, of polymerized units of monomers comprising N-methylol groups. In one embodiment, the copolymer of the composition comprises no more than 1 weight percent, based on the weight of the copolymer, of polymerized units of a self-crosslinking monomer. In another embodiment, the copolymer comprises no more than 0.75 weight percent, based on the weight of the copolymer, of polymerized units of monomers comprising N-methylol groups or a self-crosslinking monomer. In another embodiment, the copolymer comprises no more than 0.5 weight percent, based on the weight of the copolymer, of polymerized units of monomers comprising N-methylol groups or a self-crosslinking monomer. In a preferred embodiment, the copolymer does not comprise polymerized units of monomers comprising N-methylol groups or a self-crosslinking monomer.

The composition provides a binder useful for making heat resistant nonwovens with a good balance of performance attributes including dry and wet tensile strength as well as tear strength.

This invention also is a method for treating substrates, such as glass fiber nonwovens, with such a composition, the method comprising forming an aqueous admixture by admixing the components of the invention with water or one or more aqueous solvent; contacting said substrate with the aqueous admixture or, alternatively, applying the aqueous admixture to the substrate; and heating the aqueous admixture at a temperature of from 100° C. to 400° C. The aqueous admixture may comprise from 1% to 25% by weight, based on the weight of solids of the amino resin of the present invention, of the at least one aqueous dispersion of particles of the copolymer of the present invention. This same method for treating substrates with such a composition may be used wherein the multi-ethylenically unsaturated monomer of the copolymer comprises allyl (meth)acrylate. Similarly, this same method may be used when the copolymer comprises no more than 0.5 weight percent, based on the weight of the copolymer, of a self-crosslinking monomer, or when the copolymer does not comprise a self-crosslinking monomer. This method can be used to treat substrates such as fibrous articles, non-woven articles or composites.

The latex emulsion (co)polymer (a) of the curable aqueous composition can be an addition polymer or copolymer comprising at least one copolymerized ethylenically unsaturated acid-functional monomer. Preferably, the acid-functional monomer is a carboxylic acid-containing monomer.

As used herein, the term "acid-functional monomer" refers to ethylenically unsaturated monomers containing acid groups or their salts. This includes monomers containing carboxylic acid groups.

When we refer to "(co)polymer" we refer to either a homopolymer or copolymer, or both of them in combination. We use the term "(meth)acrylate" to refer to either acrylate or methacrylate and the term "(meth)acrylic" refers to either acrylic or methacrylic.

Herein, "wt %" means weight percent based on solids, unless otherwise stated.

Herein, the term "pre-crosslinking" refers to an internally crosslinked latex emulsion (co)polymer ("intraparticle crosslinking"). That is, each latex emulsion (co)polymer particle is crosslinked, within the individual particle during polymer synthesis, before admixture with the amino resin. This is distinct from the term "self-crosslinking" which generally has been used in some descriptions in the prior art in which an emulsion polymer contains reactive functional groups selected to react with functionality on the amino resin at high temperature during the curing process. Thus, "self-crosslinking" produces a binder product which is the combination of the emulsion polymer and amino resin, and the combined binder product is regarded as being crosslinked. More generally, a "self-crosslinking" monomer refers to a monomer that provides cross-links either from particle to particle ("inter-particle crosslinking"), or from particle to resin matrix, and specifically does not include the pre-crosslinking that is produced within the particle ("intraparticle crosslinking) by, for example, multiethylenically unsaturated monomers. The endpoints of all ranges directed to the same component or property are inclusive of the endpoint and independently combinable.

In a preferred embodiment, the curable (co)polymer composition is a curable aqueous-based composition. "Aqueous" as used herein includes water, and mixtures of water and water-miscible solvents.

"Glass transition temperature" or "$T_g$" is the glass transition temperature, of a copolymer calculated with the Fox equation [*Bulletin of the American Physical Society* 1, 3 Page 123 (1956)] as follows:

$$\frac{1}{T_g} = \frac{w_1}{T_{g(1)}} + \frac{w_2}{T_{g(2)}}$$

For a copolymer, $w_1$ and $w_2$ refer to the weight fraction of the two comonomers, based on weight of monomers charged to the reaction vessel, and $T_{g(1)}$ and $T_{g(2)}$ refer to the glass transition temperatures of the two corresponding homopolymers in degrees Kelvin. For polymers containing three or more monomers, additional terms are added ($w_n/T_{g(n)}$). The glass transition temperatures of homopolymers for the purposes of this invention are those reported in "Polymer Handbook", edited by J. Brandrup and E. H. Immergut, Interscience Publishers, 1966, unless that publication does not report the Tg of a particular homopolymer, in which case the Tg of the homopolymer is measured by differential scanning colorimetry (DSC). To measure the glass transition temperature of a homopolymer by DSC, the homopolymer sample is prepared and maintained in the absence of ammonia or primary amine. The homopolymer sample is dried, preheated to 120° C., rapidly cooled to −100° C., and then heated to 150° C., at a rate of 20° C./minute while data is collected. The glass transition temperature for the homopolymer is measured at the midpoint of the inflection using the half-height method.

The Fox calculation of the $T_g$ for a copolymer containing crosslinking monomers as polymerized units, is based on glass transition temperatures for the homopolymers formed from each crosslinking monomer wherein the homopolymer is not in the presence of ammonia or a primary amine. The glass transition temperature values for homopolymers formed from the anionic monomers are for anionic homopolymers in the acid form. For the case in which the emulsion (co)polymer particles are made up of two or more mutually incompatible (co)polymers, the Tg is calculated for each (co)polymer phase according to the component monomers present in each (co)polymer.

Amino resins, such as urea formaldehyde resins, are well known and widely commercially available. They are formed, for example, from the reaction of urea and formaldehyde to form compounds containing methylol groups, which subsequently under the application of heat, with or without catalysts, react further, or condense, or cure to form polymers. The methylol groups in the resin are known to react with active hydrogen groups such as other methylol groups to form ether or methylene groups thereby forming polymeric structures. Such polymeric structures are generally brittle and nonwovens containing such resins as binders tend to be relatively inflexible. Examples of commercially available urea formaldehyde resins include Casco-Resin FG-413F (Borden, Inc.) and GP™ 2980 RESI-MAT™ Glass Mat Binder Resin. As indicated above, amino resin binders have commonly been modified by formulating the amino resin with a latex (emulsion) polymer containing methylolacrylamide to provide self-crosslinking. Examples of commercially available acrylic modifiers that contain methylolacrylamide to provide self-crosslinking in amino resin binders include Rhoplex™ GL-618 and Rhoplex™ GL-720 (both from Rohm and Haas Company, Philadelphia, USA). Such products find utility in product areas that require higher performance in terms of mechanical properties.

This invention provides a water-dispersed coating composition, which can be referred to as an acrylic modified amino resin composition. The amino resin component of this invention, for example, may be at least one amino resin selected from the group consisting of melamine/formaldehyde resin, urea/formaldehyde resin, guanamine/formaldehyde resin, benzoguanamine/formaldehyde resin and acetoguanamine/formaldehyde resin, and the like, as is known in the art. Preferred are urea-formaldehyde (UF) resins. The amino resin may also comprise a polymer modifier, such as a (meth)acrylic (co)polymer, a polyvinyl-alcohol (co)polymer, a styrene-(meth)acrylic copolymer, a styrene-(meth)acrylic acid copolymer, a styrene-butadiene copolymer, a styrene-maleic anhydride copolymer, or a copolymer comprising styrene, maleic anhydride, and a (meth)acrylic acid, or a copolymer comprising styrene, maleic anhydride, and a (meth)acrylate.

The polymer particles of at least one emulsion (co)polymer (a) are latex emulsion (co)polymers comprising, based on the weight of the copolymer, from 96 to 99.8 weight percent of at least one monoethylenically unsaturated monomer; from 0.1 to 2 weight percent of a multi-ethylenically unsaturated monomer; from 0.1 to 2 weight percent of (meth)acrylamide; and optionally from 0 to 2 weight percent of an acid functional monomer, and result from emulsion polymerization processes, as described below.

The latex emulsion (co)polymer of this invention comprises one or more copolymerized multi-ethylenically unsaturated monomers such as, for example, allyl methacrylate (ALMA), allyl acrylate, diallyl phthalate, 1,4-butylene glycol dimethacrylate, 1,2-ethylene glycol dimethacrylate, 1,6-hexanediol diacrylate, butadiene, trimethylolpropane triacrylate (TMPTA) and divinyl benzene. Of these, ALMA, divinylbenzene, diallyl phthalate, 1,4-butylene glycol dimethacrylate, and 1,6-hexanediol diacrylate are preferred. ALMA is the most preferred. The multi-ethylenically unsaturated monomer can be effectively employed at levels as low as 0.1 wt %, based on the weight of the copolymer, preferably from 0.1 to 10%, or 0.1 to 5%, more preferably from 0.1 to 2%, and most preferably from 0.1 to 1%, or 0.1 to 0.5%.

The latex emulsion (co)polymer of this invention further comprises one or more monomers selected from the class of monomers referred to herein as (meth)acrylamides. This includes acrylamides and alkyl-substituted acrylamides, such as acrylamide, methacrylamide, N-tert-butylacrylamide and N-methyl(meth)acrylamide. Of these, methacrylamide, and particularly acrylamide, are preferred. The (meth) acrylamide monomer is similarly employed at levels of from 0.1 to 10 wt %, based on the weight of the copolymer, or 0.1 to 5%, more preferably from 0.1 to 2%, and most preferably from 0.1 to 1%, or 0.1 to 0.5%, or 0.1 to 0.25%.

The latex emulsion (co)polymer (a) may be prepared by free radical emulsion polymerization, a technique which is well known in the art. "Emulsion polymer", or "emulsion (co)polymer", means a (co)polymer dispersed in an aqueous medium that has been prepared by emulsion polymerization techniques known in the art as is discussed in detail in D. C. Blackley, *Emulsion Polymerization* (Wiley, 1975) and also in H. Warson, *The Applications of Synthetic Resin Emulsions*, Chapter 2 (Ernest Benn Ltd., London 1972). By "nonionic monomer" herein is meant that the copolymerized monomer residue does not bear any substantial ionic charge between pH=1-14. It is particularly advantageous that the cured composition has both flexibility and strength. The emulsion polymer preferably has a Tg of less than 90° C. For some applications, the emulsion polymer preferably has a Tg of less than 75° C., or less than 50° C., or even less than 40° C., less than 25° C., or even less than 0° C.

The monoethylenically-unsaturated nonionic acrylic monomers of the latex emulsion (co)polymer may include, for example, (meth)acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate; hydroxyalkyl(meth)acrylate monomers such as 2-hydroxyethyl methacrylate, 2-hydroxyethyl acrylate, 2-hydroxypropyl methacrylate, 1-methyl-2-hydroxyethyl methacrylate, 2-hydroxypropyl acrylate, 1-methyl-2-hydroxyethyl acrylate, 2-hydroxybutyl methacrylate and 2-hydroxybutyl acrylate. Other preferred monomers of the latex emulsion (co)polymer may include, for example, N,N-dimethylaminoethyl (meth)acrylate, N,N-dimethylaminopropyl (meth)acrylamide, N-vinyl pyrrolidinone, or hydroxyethyl (meth)acrylate. Other ethylenically-unsaturated nonionic monomers which may be incorporated into the polymer include vinylaromatic compounds, such as styrene, α-methylstyrene, p-methylstyrene, ethylvinylbenzene, vinylnaphthalene, vinylxylenes, vinyltoluenes, and the like; vinyl acetate, vinyl butyrate and other vinyl esters; vinyl monomers such as vinyl alcohol, vinyl ethers, vinyl chloride, vinyl toluene, vinyl benzophenone, and vinylidene chloride; allyl ethers; and olefins.

Preferably, the latex emulsion (co)polymer does not include monomers that provide any substantial amount of "self-crosslinking", since such an approach compromises the tear strength of the resulting cured acrylic modified amino resin material. Thus, in a preferred embodiment of the present invention, the coating composition comprises an aqueous dispersion of particles made from a copolymer wherein the copolymer specifically does not comprise polymerized units of monomers comprising N-methylol groups, such as N-methylolacrylamide or N-methylolmethacrylamide. Similarly, and for the same reason, in a preferred embodiment the copolymer does not comprise a glycidyl functional monomer.

The latex emulsion (co)polymer may further comprise one or more monoethylenically-unsaturated acid functional monomer, such as, for example, acrylic acid, methacrylic acid, crotonic acid, itaconic acid, fumaric acid, maleic acid, monomethyl itaconate, monomethyl fumarate, monobutyl fumarate, maleic anhydride, 2-acrylamido-2-methylpropane sulfonic acid, vinyl sulfonic acid, styrene sulfonic acid, 1-allyloxy-2-hydroxypropane sulfonic acid, alkyl allyl sulfosuccinic acid, sulfoethyl(meth)acrylate, phosphoalkyl (meth)acrylates such as phosphoethyl(meth)acrylate, phosphopropyl(meth)acrylate, and phosphobutyl(meth)acrylate, phosphoalkyl crotonates, phosphoalkyl maleates, phosphoalkyl fumarates, phosphodialkyl(meth)acrylates, phosphodialkyl crotonates, and allyl phosphate. Preferably, the latex emulsion (co)polymer comprises from 0% to 2% by weight, based on the weight of the copolymer, of acid-functional monomers, or 0.1 to 2%, or, alternatively, 0% to 1%, or 0.1 to 1%, and even more preferably from 0% to 0.5%, or 0.1% to 0.5%. Preferably, the acid-functional monomer is acrylic acid or methacrylic acid or a combination thereof.

The carboxyl groups of the latex emulsion (co)polymer composition may be neutralized with a base. The neutralization may at least partially occur prior to, or while treating a substrate.

In one embodiment of the invention, the carboxyl groups of the latex emulsion (co)polymer composition may be at least partially neutralized with a fixed base, meaning a base which is substantially non-volatile under the conditions of the treatment such as, for example, sodium hydroxide, potassium hydroxide, sodium carbonate, or t-butylammonium hydroxide. The fixed base is sufficiently nonvolatile that it will substantially remain in the composition during heating and curing operations. Fixed multivalent bases such as, for example, calcium carbonate can tend to destabilize an aqueous dispersion, but can be used in minor amount.

In a different embodiment of the invention, the carboxyl groups may be neutralized with a volatile base, meaning a base which will substantially volatilize during the heating and curing process. Suitable volatile bases for neutralization include, for example, ammonia or volatile lower alkyl amines. The volatile base can be used in addition to the fixed base.

Anionic or nonionic surfactants, or mixtures thereof, can be used in the emulsion polymerization. For some applications, such as those requiring resistance to water sensitivity, the use of polymerizable surfactants (also known as reactive surfactants) can be advantageous; these surfactants are known in the art, as described, for example, in U.S. Patent Publication No. 2003/0149119 or U.S. Patent Publication No. 2001/0031826. The polymerization can be carried out by various means such as, for example, with all of the monomers added to the reaction kettle prior to beginning the polymerization reaction, with a portion of the ethylenically-unsaturated monomer in emulsified form present in the reaction kettle at the beginning of the polymerization reaction, or with a small particle size emulsion polymer seed present in the reaction kettle at the beginning of the polymerization reaction.

The polymerization reaction to prepare the latex emulsion (co)polymer can be initiated by various methods known in the art such as, for example, by using the thermal decomposition of an initiator and by using an oxidation-reduction reaction ("redox reaction") to generate free radicals to effect the polymerization. The latex emulsion (co)polymer can be prepared in water or in solvent/water mixtures such as, for example, i-propanol/water, tetrahydrofuran/water, and dioxane/water.

Chain transfer agents such as mercaptans, polymercaptans, and halogen compounds can be used in the polymerization mixture in order to moderate the molecular weight of the (co)polymer composition. Generally, from 0% to 10% by weight, based on the weight of the (co)polymer, of $C_4$-$C_{20}$ alkyl mercaptans, mercaptopropionic acid, or esters of mercaptopropionic acid, can be used.

The latex emulsion (co)polymer particles can be made up of two or more mutually incompatible (co)polymers. These mutually incompatible (co)polymers can be present in various morphological configurations such as, for example, core/shell particles, core/shell particles with shell phases incompletely encapsulating the core, core/shell particles with a multiplicity of cores, interpenetrating network particles, and the like. In such cases, at least one of the phases may have a Tg of less than 90° C., in some applications preferably less than 75° C., or less than 50° C., or less than 40° C., less than 25° C., or even less than 0° C.

The weight average particle diameter of the latex emulsion (co)polymer can be from 30 nanometers to 1000 nanometers, preferably 30 to 500 nanometers, and more preferably 30-300 nanometers as measured using a Brookhaven BI-90 Particle Sizer. However, polymodal particle size distributions such as those disclosed in U.S. Pat. Nos. 4,384,056 and 4,539,361, hereby incorporated herein by reference, can be employed.

In one embodiment of the invention, and also for applications for which enhanced waterproofing properties are desired of the curable composition, the emulsion polymer of this invention is a predominately hydrophobic emulsion polymer including, as polymerized units, greater than 30%, preferably greater than 40%, more preferably greater than 50%, and also advantageously greater than 60%, by weight, based on the weight of the emulsion polymer solids, of an ethylenically-unsaturated acrylic monomer including a $C_5$ or greater alkyl group. This approach to waterproofing has been disclosed in U.S. Patent Publication No. 20050048212A1. "Acrylic monomer including a $C_5$ or greater alkyl group" means an acrylic monomer bearing an aliphatic alkyl group having five or more C atoms, the alkyl group including n-alkyl, s-alkyl, i-alkyl, and t-alkyl groups. Suitable ethylenically-unsaturated monomers including a $C_5$ or greater alkyl group include ($C_5$-$C_{30}$) alkyl esters of (meth)acrylic acid, such as amyl (meth)acrylate, 2-ethylhexyl(meth)acrylate, benzyl(meth)acrylate, lauryl(meth)acrylate, oleyl (meth)acrylate, palmityl(meth)acrylate, stearyl(meth)acrylate; unsaturated vinyl esters of (meth)acrylic acid such as those derived from fatty acids and fatty alcohols; surfactant monomers including long chain alkoxy- or alkylphenoxy (polyalkylene oxide) (meth)acrylates, such as $C_{18}H_{37}$-(ethylene oxide)$_{20}$ methacrylate and $C_{12}H_{25}$-(ethylene oxide)$_{23}$ methacrylate; N-alkyl substituted (meth)acrylamides such as octyl acrylamide; and the like. The monomer including a $C_5$ or greater alkyl group can also contain functionality, such as amido, aldehyde, ureido, polyether and the like, but preferably does not contain an acid or hydroxy group. Emulsion polymers containing such monomers can be prepared by emulsion polymerization, preferably by the method for forming polymers of U.S. Pat. No. 5,521,266.

A surfactant may be added to the emulsion polymer before or during the blending of the emulsion polymer with the amino resin composition. Preferably, the surfactant is added in the amount of from 0.5% to 20%, preferably from 2% to 10%, by weight, based on the weight of emulsion polymer solids. Preferred is a surfactant having a HLB value of greater than 15.

A particularly advantageous embodiment of the invention provides a water dispersed coating composition comprising a UF resin, and an aqueous dispersion of emulsion polymer particles, of Tg~40-80° C. and particle diameter in the range from 30 to 300 nanometers, comprising 0.5% to 1% of ALMA, and 0.25% to 0.5% of acrylamide, all weight percentages being taken on a solids basis of the emulsion polymer. In this preferred embodiment, the copolymer does not comprise polymerized units of monomers comprising N-methylol groups or a self-crosslinking monomer. For this preferred embodiment, the latex emulsion polymer compositions described by Ex. 1 or Ex. 5 in Table 1 are suitable for admixture with the UF resin, in a UF/latex blend weight ratio of 9:1, at 20% solids (i.e. 9 parts by weight of UF resin solids per 1 part by weight of latex emulsion polymer solids, in 40 parts of water).

In one embodiment, the copolymer of the coating composition is formed by a process whereby at least 75% of the multi-ethylenically unsaturated monomer (ii) is added by staged feed of the monomer during the second half, by weight, of the feed of monomers (i).

The curable aqueous composition may be prepared by admixing water, the amino resin, and the latex emulsion (co)polymer using conventional mixing or stirring techniques.

The composition of this invention can contain, in addition, conventional treatment components such as, for example, emulsifiers; pigments; fillers or extenders; anti-migration aids; curing agents; coalescents; surfactants, particularly nonionic surfactants; spreading agents; mineral oil dust suppressing agents; biocides; plasticizers; organosilanes; amino silanes; anti-foaming agents such as dimethicones, silicone oils and ethoxylated nonionics; corrosion inhibitors, particularly corrosion inhibitors effective at pH<4 such as thioureas, oxalates, and chromates; colorants; antistatic agents; lubricants; waxes; anti-oxidants; coupling agents such as silanes, particularly Silquest™ A-187 (manufactured by GE Silicones—OSi Specialties, located in Wilton, Conn., USA); Wetlink Silanes from GE (e.g Wetlink 78), and Dynasylan™ silanes from Degussa particularly, epoxy silanes such as, but not limited to, Dynasylan™ GLYMO and GLYEO; and oligomeric silanes such as HYDROSIL™. Also, polymers not of the present invention; and waterproofing agents such as silicones and emulsion polymers, particularly hydrophobic emulsion polymers containing, as copolymerized units, greater than 30% by weight, based on the weight of the emulsion polymer solids, ethylenically-unsaturated acrylic monomer containing a C5 or greater alkyl group.

The composition of this invention may be used for treating various substrates. Such treatments can be commonly described as, for example, coating, sizing, saturating, bonding, combinations thereof, and the like. Typical substrates include fibers such as polyester, glass fibers; glass fiber non-wovens; woven and non-woven fabrics; and the like and their composite fibers; wood, including, for example, solid wood, wood particles, fibers, chips, flour, pulp, and flakes; metal; and plastic. The (co)polymer blend composition can be applied to a substrate by conventional techniques such as, for example, air or airless spraying, padding, saturating, roll coating, foam coating, curtain coating, beater deposition, coagulation, or the like. The amount of aqueous admixture which is applied is from 10-35% LOI (loss on ignition).

The glass fiber non-woven may be prepared from fibers of various length which may have been previously subjected to various treatment or primer steps. The glass fiber non-woven may be of various thicknesses as appropriate for the desired end use and may have been formed by wet laid or dry laid processes.

In one embodiment of this invention, the composition can be used as a binder for heat-resistant non-woven fabrics such as, for example, non-wovens which contain heat-resistant fibers such as, for example, aramid fibers, ceramic fibers, metal fibers, carbon fibers, polyimide fibers, certain polyester fibers, rayon fibers, rock wool, and glass fibers. "Heat-resistant fibers" mean fibers which are substantially unaffected by exposure to temperatures above 125° C. Heat-resistant non-wovens can also contain fibers which are not in themselves heat-resistant such as, for example, certain polyester fibers, rayon fibers, nylon fibers, and super-absorbent fibers, in so far as they do not materially adversely affect the performance of the substrate.

The non-woven fabrics incorporating a (co)polymer composition should substantially retain the properties contributed by the cured aqueous composition such as, for example, tensile strength, and not substantially detract from essential non-woven fabric characteristics. The cured composition should not be too rigid or brittle, or become sticky under processing conditions.

The curable aqueous (co)polymer composition, after it is applied to a substrate, is heated to effect drying and curing. The duration and temperature of heating will affect the rate of drying, processability, handleability; and property development of the treated substrate. Heat treatment at from 120° C. to 400° C. for a period of time between from 3 seconds to 15 minutes can be carried out; treatment at from 175° C. to 225° C. is preferred. A "curable aqueous composition" herein means an aqueous composition that requires heat treatment to at least 100° C. in order to effect the cure. The drying and curing functions can be performed in two or more distinct steps, if desired. For example, the composition can be first heated at a temperature and for a time sufficient to substantially dry but not to substantially cure the composition, and then heated for a second time at a higher temperature and/or for a longer period of time to effect curing. Such a procedure, referred to as "B-staging," can be used to provide a binder-treated non-woven, for example, in roll form, which can at a later stage be cured, with or without forming or molding into a particular configuration, concurrent with the curing process.

The heat-resistant non-wovens can be used for applications such as, for example, insulation batts or rolls, as reinforcing mat for roofing or flooring applications, as roving, as microglass-based substrate for printed circuit boards or battery separators, as filter stock (e.g. for air duct filters), as tape stock, and as reinforcement scrim in cementitious and non-cementitious coatings for masonry, in ceiling tiles, cellulosic roofing tiles, window treatments, wall coverings, molded parts, for curly pulp modification, for powder coating, and the like.

The flexible acrylic modified amino resin binders of the invention are also useful for bonding wood chips, abrasive matts, decorative laminate paper, laminating adhesives, filtration paper, or cotton rag bonding for automotive sound insulation.

EXAMPLES

The following abbreviations are used in the Examples:
SLS—sodium lauryl sulfate
MMA—methyl methacrylate
BA—butyl acrylate
ALMA—allyl methacrylate
AM—acrylamide
MOA—methylolacrylamide as supplied (50% methylolacrylamide:50% acrylamide)
DI water—deionized water

Example 1

Latex Preparations

Latex Polymer Ex. 1—Latex Used in Binder Ex. 1.
After heating 340 g DI water and 5.0 g SLS (28% Solids) to 90° C., 2.4% of a monomer mixture of 199 g water, 2.5 g SLS (28%), 349 g MMA, 100 g BA, 4.58 g ALMA and 2.25 g AM is added followed by 5.2 g ammonium persulfate solution (27.3% solids). This combination is held at 88° C. for 5 minutes. Then, the remaining monomer mix is added gradually along with 19.7 g of a 1.6% aqueous ammonium persulfate solution. The reaction mixture is cooled to 70° C. and 2.0 g of an iron sulfate solution (0.26% solids) is added. While at 70° C., 13 g of a 13.4% aqueous t-butyl hydroperoxide solution and 26 g of a 3.8% aqueous solution of hydroxymethane sulfonic acid monosodium salt are gradually added, and then the mixture is further cooled to 40° C. and aqueous ammonia is added to adjust pH to 8.5. The product is filtered through 100 and 325 mesh screens.
Latex Polymer Ex.2—Latex Used in Binder Ex. 2.
The process according to Latex Polymer Ex.1 where the monomer mixture is 199 g water, 2.5 g SLS (28%), 349 g MMA, 100 g BA, 2.28 g ALMA and 4.55 g AM.
Latex Polymer Ex.3—Latex Used in Binder Ex. 3.
The process according to Latex Polymer Ex.1 where the monomer mixture is 199 g water, 7.5 g SLS (28%), 349 g MMA, 100 g BA, 2.28 g ALMA and 4.55 g AM.
Latex Polymer Ex.4—Latex Used in Binder Ex. 4.

The process according to Latex Polymer Ex. 1 where the monomer mixture is 199 g water, 7.5 g SLS (28%), 349 g MMA, 100 g BA, 2.28 g ALMA and 4.55 g AM.

Latex Polymer Ex.5—Latex Used in Binder Ex. 5.

The process according to Latex Polymer Ex.1 where the monomer mixture is 199 g water, 2.5 g SLS (28%), 349 g MMA, 100 g BA, 2.29 g ALMA and 1.15 g AM.

Latex Polymer Ex.6—Latex Used in Binder Ex. 6.

The process according to Latex Polymer Ex.1 where the monomer mixture is 199 g water, 2.5 g SLS (28%), 349 g MMA, 100 g BA, 4.58 g ALMA and 1.15 g AM.

Latex Polymer Ex.7—Latex Used in Binder Ex. 7.

The process according to Latex Polymer Ex.1 where the initial charges are increased to 470 g DI water and 20 g SLS (28% solids) and where the monomer mixture is 199 g water, 2.5 g SLS (28%), 349 g MMA, 100 g BA, 4.58 g ALMA and 1.15 g AM.

Latex Polymer Ex.8—Latex Used in Binder Ex. 8.

The process according to Latex Polymer Ex. 1 where the initial charges are increased to 470 g DI water and 20 g SLS (28% Solids) and where the monomer mixture is 199 g water, 2.5 g SLS (28%), 404 g MMA, 45.4 g BA, 4.58 g ALMA and 1.15 g AM.

Latex Polymer C4—Latex Used in Comparative Binder C4.

The process according to Latex Polymer Ex.1 where the monomer mixture is 199 g water, 2.5 g SLS (28%), 349 g MMA, 100 g BA and 4.58 g ALMA.

Latex Polymer C5—Latex Used in Comparative Binder C5.

The process according to Latex Polymer Ex.1 where the monomer mixture is 199 g water, 2.5 g SLS (28%), 345.6 g MMA, 100 g BA, 2.29 g ALMA and 15.16 g of Flocryl™ MOA 45% (a 45% solids aqueous methylolacrylamide solution).

Latex Polymer C6—Latex Used in Comparative Binder C6.

The process according to Latex Polymer Ex.1 where the monomer mixture is 199 g water, 2.5 g SLS (28%), 348 g MMA, 103 g BA, 2.3 g ALMA and 31.0 g of Flocryl™ MOA 45% (a 45% solids aqueous methylolacrylamide solution).

Latex Polymer C7—Latex Used in Comparative Binder C7.

The process according to Latex Polymer Ex.1 where the monomer mixture is 199 g water, 2.5 g SLS (28%), 349 g MMA, 100 g BA, 4.6 g ALMA and 30.9 g of Flocryl™ MOA 45% (a 45% solids aqueous methylolacrylamide solution).

Latex Polymer C8—Latex used in Comparative Binder C8.

The process according to Latex Polymer Ex.1 where the monomer mixture is 199 g water, 2.5 g SLS (28%), 349 g MMA, 100 g BA and 2.25 AM.

Example 2

Preparation of Aqueous Admixture of Urea Formaldehyde (UF) Resin and Latex Emulsion Polymer An aqueous admixture with a UF/latex blend weight ratio of 9:1, at 20% solids, i.e. 9 weight parts UF resin solids per 1 part latex solids in 40 parts of water, is prepared.

In the table below, Comparative Binder C1 is simply the UF resin alone (SU-100, from Hexion Specialty Chemicals, Columbus, Ohio, USA). This control sample is included in order to demonstrate the properties of the UF resin without any latex polymer modifier. The other entries in Table 1 are the latex compositions that are admixed with that UF resin, as described above, in order to produce the binder samples studied below.

TABLE 1

Latex Emulsion Polymer Compositions.

| Binder | Latex Polymer | Latex Composition* | ps (nm) |
|---|---|---|---|
| C1 | SU-100 UF Resin | (none) | |
| C2 | Rhoplex ™ GL-618 | all acrylic self-crosslinking (MOA) latex | |
| C3 | Rhoplex ™ GL-720 | all acrylic self-crosslinking (MOA) latex | |
| C4 | Latex Polymer C4 | 22 BA/77.0 MMA/ 1.0 ALMA | 85 |
| C5 | Latex Polymer C5 | 22 BA/76 MMA/0.5 ALMA/ 1.5 MOA | 86 |
| C6 | Latex Polymer C6 | 22 BA/74.5 MMA/0.5 ALMA/3.0 MOA | 84 |
| C7 | Latex Polymer C7 | 21 BA/75.0 MMA/ 1.0 ALMA/3.0 MOA | 85 |
| C8 | Latex Polymer C8 | 22.5 BA/77 MMA/0.5 AM | 88 |
| Ex. 1 | Latex Polymer Ex. 1 | 22 BA/76.5 MMA/1.0 ALMA/ 0.5 AM | 83 |
| Ex. 2 | Latex Polymer Ex. 2 | 22 BA/77 MMA/0.5 ALMA/ 0.5 AM | 84 |
| Ex. 3 | Latex Polymer Ex. 3 | 22 BA/77 MMA/0.5 ALMA/ 0.5 AM | 158 |
| Ex. 4 | Latex Polymer Ex. 4 | 22 BA/77 MMA/0.5 ALMA/ 0.5 AM | 258 |
| Ex. 5 | Latex Polymer Ex. 5 | 22 BA/77.25 MMA/0.5 ALMA/0.25 AM | 80 |
| Ex. 6 | Latex Polymer Ex. 6 | 22 BA/76.75 MMA/1.0 ALMA/0.25 AM | 81 |
| Ex. 7 | Latex Polymer Ex. 7 | 22 BA/76.75 MMA/1.0 ALMA/0.25 AM | 51 |
| Ex. 8 | Latex Polymer Ex. 8 | 10 BA/88.75 MMA/1.0 ALMA/0.25 AM | 46 |

*"MOA" = 50% methylolacrylamide:50% acrylamide.

Example 3

Glass Mat Preparation Procedure and Test Procedures

This procedure is employed to prepare the mats used in the examples that follow. Glass fiber nonwoven handsheets are prepared with Johns Manville 137 Standard, 1¼ inch length, sized glass chop using approximately 7.6 grams of glass fiber per sheet (1.8 pounds per 100 square feet). The glass fiber is dispersed in water using SUPERFLOC™ A-1883 RS (Cytec Industries Incorporated, West Paterson, N.J., USA), an anionic polyacrylamide water-in-oil emulsion, and RHODAMEEN™ VP-532 SPB (Rhodia Chemical Company, Cranbury, N.J., USA), an ethoxylated fatty amine cationic dispersing agent. Handsheets are formed in a Williams handsheet mold. The wet sheet is transferred to a vacuum station and de-watered. An aqueous admixture of the UF/latex blend of Example 2 is prepared and applied to the de-watered sheet and the excess is vacuumed off. The sheets are dried/cured in a forced air oven for 2½ minutes at 200° C. The binder amount on the samples is 20% LOI (loss on ignition).

Determination of LOI (Loss On Ignition)

A 2.5 inch by 3 inch piece of dried/cured fiberglass mat was cut The sample was weighed and then placed in a muffle furnace at 650 C. for 2 minutes. The sample was removed and then reweighed. % LOI was calculated using the equation:

% LOI=(weight before burning−weight after burning)×100/weight before burning.

Tensile Strength Testing

Handsheets are cut into 1 inch by 5 inch strips for tensile testing and cut for tear testing. Tensile testing is performed on eight strips from each sample using a Thwing-Albert Intellect 500 tensile tester with a 200 lb. cell, 1 inch/min. jaw speed, 20% sensitivity, and a 3 inch gap. Dry tensile is performed on the prepared strips. Wet tensiles are run after soaking the samples for 10 minutes in 85° C. water, blotted with paper towel to soak up excess water, and tested immediately. All tensile values are reported in lbs/in.

Elmendorf Tear Strength Testing

Elmendorf tear strength is determined on cut samples of dried/cured handsheet which are 2.5 inches by 3 inches. A single ply sample is placed in a Thwing-Albert Tear Tester with a 1600 g. tear arm. The sample is notched with a 0.75 inch cut and the arm is released. The tear strength is recorded in grams (grams force).

Example 4

Performance Properties of Latex Modified UF Resin Bound Sheets

Data for dry and wet tensile strength, and tear strength, are presented in Table 2 below.

TABLE 2

Tensile and Tear Strength Properties of Latex Modified UF Resin Bound Sheets (90:10 UF Resin to Latex ratio).

| Binder | Tensile (lbs/inch) | Wet/Hot Tensile (lbs/inch) | % Retention | Tear Strength (g) |
|---|---|---|---|---|
| C1 | 27.4 | 21.4 | 78 | 543 |
| C2 | 32.9 | 21.9 | 66 | 429 |
| C3 | 35.3 | 29.3 | 83 | 412 |
| C4 | 31.2 | 25.2 | 81 | 620 |
| C5 | 36.2 | 28.0 | 77 | 476 |
| C6 | 34.6 | 24.3 | 70 | 434 |
| C7 | 37.3 | 26.3 | 71 | 483 |
| C8 | 30.9 | 32.7 | 106 | 463 |
| Ex. 1 | 34.1 | 31.7 | 93 | 562 |
| Ex. 2 | 34.3 | 29.3 | 86 | 504 |
| Ex. 3 | 35.6 | 26.1 | 73 | 560 |
| Ex. 4 | 36.1 | 26.6 | 74 | 593 |
| Ex. 5 | 37.8 | 31.7 | 84 | 557 |
| Ex. 6 | 33.4 | 31.9 | 96 | 522 |
| Ex. 7 | 33.6 | 31.1 | 93 | 553 |
| Ex. 8 | 29.8 | 33.8 | 113 | 619 |

Comparative binder example C1 illustrates the performance of the unmodified amino resin, in this case a urea-formaldehyde resin, SU-100. As is well known in the art, this type of resin tends to be relatively inflexible and brittle, as shown here by a low tensile strength (and, additionally, a low wet tensile strength).

All of the comparative binder examples and binder examples that follow C1 illustrate performance properties of acrylic modified UF resins, using the SU-100 as the UF resin in each case. Comparative binder examples C2 and C3 represent current state of the art, high performance, acrylic modified UF resins. The acrylic modifier in each of binders C2 and C3 is an all acrylic self-crosslinking MOA-containing latex (see key above). In both cases, the initial tensile strength is acceptable, on the order of 30 lbs/inch or greater, but the tear strength is compromised and does not match that of the unmodified UF resin.

Inventive binder examples, Ex. 1-8, all show a very good balance of properties, with tensile strength on the order of 30 lbs/inch or greater, while maintaining a tear strength of greater than 500 g, which is approximately comparable to, or greater than, that of the UF resin.

Comparative binder example C4 comprises ALMA, but does not incorporate AM. This comparative binder example has a low dry and wet tensile strength and fails to attain the full property balance targeted. (Compare, for example, binder C4 with binder Ex. 1 or binder Ex.6). Comparative binder example C8 comprises AM, but not ALMA, and this composition results in a relatively low tear strength. (Compare binder C8 with binder Ex.1).

TABLE 3

Effect of MOA on Tensile and Tear Strength Properties

| Binder | Tensile (lbs/inch) | Wet/Hot Tensile (lbs/inch) | % Retention | Tear Strength (g) |
|---|---|---|---|---|
| Ex. 2 | 34.3 | 29.3 | 86 | 504 |
| C5 | 36.2 | 28.0 | 77 | 476 |
| C6 | 34.6 | 24.3 | 70 | 434 |

Comparative binder examples C5 and C6 introduce methylolacrylamide into the backbone of the inventive ALMA and AM composition (additional AM is carried in by the methylol-acrylamide, which is a mixture of 50% methylolacrylamide and 50% acrylamide). As shown in Table 3, the incorporation of methylolacrylamide decreases tear strength compared to inventive binder example Ex.2 comprising an equal level of ALMA.

Comparative binder example C7 comprises ALMA, methylolacrylamide, and AM (again, the AM is carried in by the "MOA", which is a mixture of 50% methylolacrylamide and 50% acrylamide). The incorporation of methylolacrylamide results in significantly lower tear strength compared to inventive binder example Ex.1 comprising an equal level of ALMA (but no methylolacrylamide). Likewise, comparative binder example C7 (1.0 ALMA, 3.0 MOA) shows much lower tear strength compared to comparative binder example C4 (which has no methylol-acrylamide). As is true for the commercial products in binders C2 and C3, inclusion of methylol-acrylamide has a detrimental effect on tear strength.

Thus, inventive binder examples Ex. 1-8 exhibit an unexpectedly superior balance of properties compared to all of the comparative samples including both the unmodified urea formaldehyde resin-bound sample, comparative binder C1, and the state of the art (commercial) acrylic modified self-crosslinking samples, comparative binders C2 and C3.

What is claimed is:

1. A water-dispersed coating composition comprising
   a) at least one aqueous dispersion of particles of a copolymer made from, based on the weight of the copolymer:
      i from 96 to 99.8 weight percent of at least one monoethylenically unsaturated nonionic monomer not including the (meth)acrylamide of component iii;
      ii from 0.1 to 2 weight percent of a multi-ethylenically unsaturated monomer comprising allyl (meth)acrylate;
      iii from 0.1 to 2 weight percent of (meth)acrylamide;
   wherein the said copolymer comprises no more than 1 weight percent, based on the weight of the copolymer, of a self-crosslinking monomer; and
   b) at least one amino resin selected from the group consisting of melamine/formaldehyde resin, urea/formaldehyde resin, guanamine/formaldehyde resin, benzoguanamine/formaldehyde resin and acetoguanamine/formaldehyde resin or combinations thereof;

wherein the ratio of components a:b is from 1:99 to 20:80 based on the solids of both components.

2. The composition of claim 1 wherein the said copolymer further comprises from 0.1 to 2 weight percent of one or more acid functional monomer.

3. The composition of claim 1 further comprising N,N-dimethylaminoethyl (meth)acrylate, N,N-dimethylaminopropyl (meth)acrylamide, N-vinyl pyrrolidinone, or hydroxyethyl (meth)acrylate, or combinations thereof.

4. The composition of claim 1 wherein the said copolymer comprises no more than 1 weight percent, based on the weight of the copolymer, of polymerized units of monomers comprising N-methylol groups.

5. The composition of claim 1 wherein the said copolymer comprises no more than 0.5 weight percent, based on the weight of the copolymer, of a self-crosslinking monomer.

6. The composition of claim 1 wherein the said copolymer does not comprise a self-crosslinking monomer.

7. A method for treating a glass fiber non-woven comprising:
(a) forming an aqueous admixture by admixing with water, or one or more aqueous solvent, and an amino resin, from 1% to 25% by weight, based on the weight of solids of said amino resin, of at least one aqueous dispersion of particles made from a copolymer, based on the weight of the copolymer, comprising:
   i. from 96 to 99.8 weight percent of at least one monoethylenically unsaturated nonionic monomer not including the (meth)acrylamide of component iii;
   ii. from 0.1 to 2 weight percent of a multi-ethylenically unsaturated monomer comprising allyl (meth)acrylate;
   iii. from 0.1 to 2 weight percent of (meth)acrylamide; wherein the said copolymer comprises no more than 1 weight percent, based on the weight of the copolymer, of a self-crosslinking monomer; and
(b) contacting said glass fiber non-woven with said aqueous admixture or, alternatively, applying said aqueous admixture to the glass fiber non-woven; and
(c) heating said admixture at a temperature of from 100 C to 400 C.

8. The composition of claim 1 wherein the said copolymer in dispersion (a) comprises the copolymerization product of from 0.1 to 2 wt. %, based on the weight of the copolymer, of one or more mono-ethylenically unsaturated acid functional monomer.

* * * * *